United States Patent [19]

Straka

[11] Patent Number: 4,943,085
[45] Date of Patent: * Jul. 24, 1990

[54] SIDE BAR ASSEMBLY FOR VEHICLES SUCH AS PICK-UP TRUCKS, OFF-ROAD VEHICLES AND THE LIKE

[75] Inventor: Michael J. Straka, Newburgh, N.Y.

[73] Assignee: Sparkomatic Corporation, Milford, Pa.

[*] Notice: The portion of the term of this patent subsequent to Jun. 19, 2007 has been disclaimed.

[21] Appl. No.: 344,125

[22] Filed: Apr. 27, 1989

[51] Int. Cl.$^5$ ............................................. B60R 3/00
[52] U.S. Cl. ................... 280/770; 280/163; 280/169; 182/92; 293/128; 403/293
[58] Field of Search ............ 280/762, 770, 163, 164.1, 280/164.2, 169; 403/292, 293, 300; 182/92, 112, 127; 296/71, 152, 207; 293/128

[56] References Cited

U.S. PATENT DOCUMENTS

| | | | |
|---|---|---|---|
| 2,594,491 | 4/1952 | Persons | 280/770 X |
| 2,730,412 | 1/1956 | Yoder | 182/112 X |
| 2,785,842 | 3/1957 | Phelps | 182/92 |
| 4,203,611 | 5/1980 | Makela | 280/163 |
| 4,456,275 | 6/1984 | Snyder et al. | 280/163 |

FOREIGN PATENT DOCUMENTS 584124 12/1977 U.S.S.R. ............................. 403/293

OTHER PUBLICATIONS

Page 9 of prior (date unknown) catalog of Rally Accessories, Inc, of Miami Fla.

Primary Examiner—Charles A. Marmor
Assistant Examiner—Brian L. Johnson
Attorney, Agent, or Firm—Mason, Fenwick & Lawrence

[57] ABSTRACT

A side bar assembly for attachment to a chassis of a pick-up truck, off-road vehicle or the like capable of being mounted on such vehicles of a plurality of different sizes and configurations, wherein the side bar assembly is formed of a pair of substantially L-shaped tubular members as half-bar tube sections to collectively form a generally U-shaped side bar to extend laterally from a side of the vehicle. A substantially semi-cylindrical connector sleeve defining a concave tube-gripping recess receives the aligned end portions of the tubular members with the connector sleeve partially encircling and gripping the adjacent portions of the tubular members over more than half the circumferential extent of each, and mounting brackets are provided for bolt securement to the vehicle chassis to receive and support end portions of the side legs therein.

10 Claims, 3 Drawing Sheets

SIDE BAR ASSEMBLY FOR VEHICLES SUCH AS PICK-UP TRUCKS, OFF-ROAD VEHICLES AND THE LIKE

BACKGROUND AND OBJECTS OF THE INVENTION

The present invention relates in general to automotive side bars for pick-up trucks, jeeps and similar off-road vehicles.

An automotive side bar is one of the pick-up truck or off-road vehicle accessories which has gained considerable popularity recently. In essence, it is a wide U-shaped tubular bar which is attached to the side of a vehicle just below the passenger cab. It usually covers the length of the cab and projects laterally to the outside of the cab side or door surface. It is usually bolted or welded to the main longitudinal frame beam of the vehicle chassis.

The side bar is an appearance accessory as well as a functional side step and/or a protective device for the door and side of the vehicle cab to deflect brush, for example, in an off-road situation.

Side bars have been manufactured and sold of some time, primarily by small off-road equipment outfits, and now are available in a limited way from larger automotive accessory companies. Side bars, to the best of applicant's knowledge, as available on the market today, are "fixed dimension" products individually designed for a specific vehicle type. Separate side bars of such "fixed dimension" types with different dimensions and/or mounting systems are typically manufactured for different vehicle makes and models, and consequently the supplier is required to stock a large number of different side bar stocking units. The side bar system of the present invention, in contrast with available fixed dimension designs of numerous sizes, is a single product kit adaptable to fit a large variety of pick-up trucks and similar vehicle regardless of the vehicles make, size or model.

More particularly, side bars require mounting on the main longitudinal frame beam of the vehicle chassis because only the main beam is strong enough to support forces which may be applied to the side bar. The overall size of the side bar, both its length and depth, is affected by many different factors. The length is given mainly by the size of the cab but it is also affected by the availability of suitable unobstructed surface on the vehicle chassis frame. The depth of a side bar is given by the distance from the main frame to the outside of the vehicle cab. This distance may be different at various places on the same vehicle.

The design of pick-up truck chassis naturally varies, not only among different makes and sizes of vehicles, but also may vary among truck models of the same make and size. This is caused by the availability of different cab sizes which may require different cab support members off the main frame or by optional equipment which may be mounted to the vehicle chassis, or by other variations such as a two-wheel/four-wheel drive or load carrying capabilities, etc. In addition, the main beams of vehicle chassis are linear in some cases and angled either up or down or in or out in others.

Because of all these complications, a typical side bar as available on the market at the present time is a one piece U-shaped tube of a specific length and depth dimensioned to fit a specific make, size and model of a vehicle. Accessory producers typically limit the availability of side bar to the most popular pick-up trucks because many retails stores are not willing to carry a very large inventory of such side bar stocking units.

Another object of the present invention is the provision of a side bar kit or assembly as a single stocking unit applicable to a wide variety of vehicles because of the adjustable design. This greatly simplifies the manufacture and the resulting cost of the item, as well as simplifying distribution and warehousing, and significantly minimizes demand on expensive retail store storage and display floor space. Important benefits are also available to a customer from the applicants adjustable design, as the customer is able to obtain a product for his vehicle directly from a local mass merchandise store.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 1 is a perspective view of a side bar assembly constructed in accordance with the present invention to be mounted on a vehicle such as a pick-up truck, off road vehicle or the like;

DETAILED DESCRIPTION OF PREFERRED EMBODIMENTS

Figure 1:
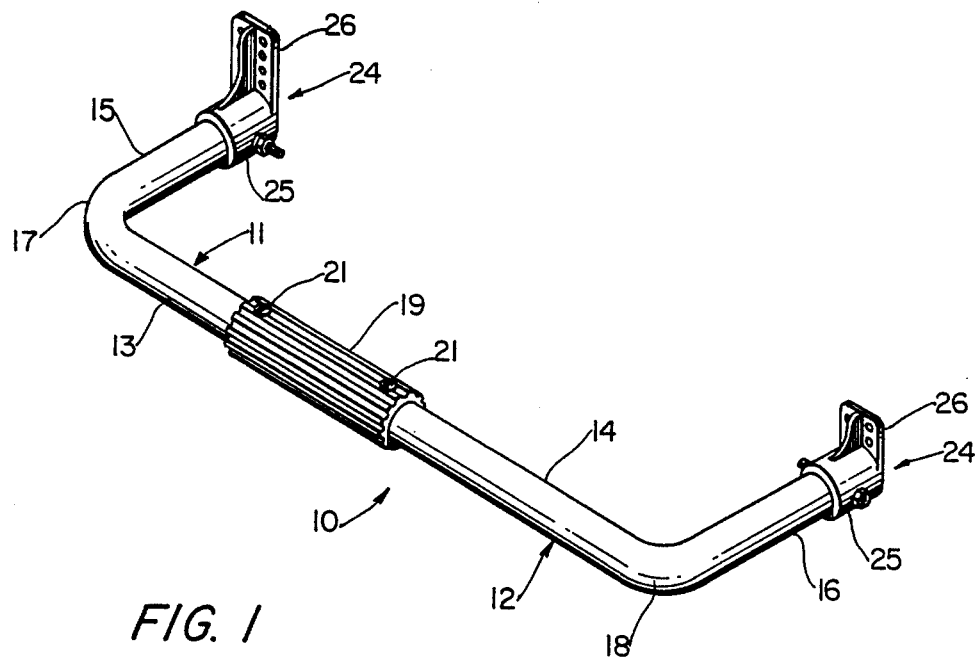

Referring to the drawing, wherein like reference characters designate corresponding parts throughout the several parts, the adjustable side bar assembly for pick-up trucks, off road vehicles and the like, embodying the present invention, is indicated generally by the reference character 10, and is shown in FIG. 1 to be mounted on one side of the vehicle. It will be understood either one side bar assembly may be provided for one side of the vehicle, or a pair of side bar assemblies may be mounted on opposite sides of the vehicles. Ordinarily, the complete product package as sold would include two side bar assemblies, one for each side of the vehicle. The ensuing description will be directed to a single side bar assembly for one side of the vehicle, it being understood that the other side bar assembly is of like construction.

The single side bar assembly 10 illustrated in FIG. 1, comprises two substantially L-shaped tubular members 11, 12, which in the illustrated embodiment are each formed 2½ inch diameter steel tubes, each having one 90 degree bend. These two L-shaped half-bar sections 11 and 12 together comprise the maximum side bar dimension, which in one illustrated embodiment is approximately 23" deep and 52 ½" long. In the illustrated embodiment, the L-shaped half-bar sections 11 and 12, respectively, include a straight longitudinal leg 13, 14 and a straight transverse leg 15, 16 joined together at the right angle bend 17 or 18, respectively, with the transverse legs 15 and 16 forming the outwardly extending leg portion of the complete, assembled side bar 10 and the two legs 13, 14 forming the outboard longitudinal leg portion paralleling the longitudinal axis of the vehicle. The two L-shaped half-bar sections are jointed together at the adjacent ends of the longitudinal legs 13 and 14 by an encircling connector sleeve 19 having a concave circular cross-section curved portion 20 of appropriate size to receive and partially wrap around the tubes forming the legs 13 and 14 of the half-bar sections therein. The adjacent ends of the tube portions 13 and 14 fit inside the curved portion 20, after which the connector 19 is tightly secured to the tubular end portions received therein by set screws 21. Obviously other suitable fasteners may be employed instead of the screws 21 securely fix connector sleeve 19 to the end portions of the L-shaped half bars 11, 12 inserted therein.

Figure 2:
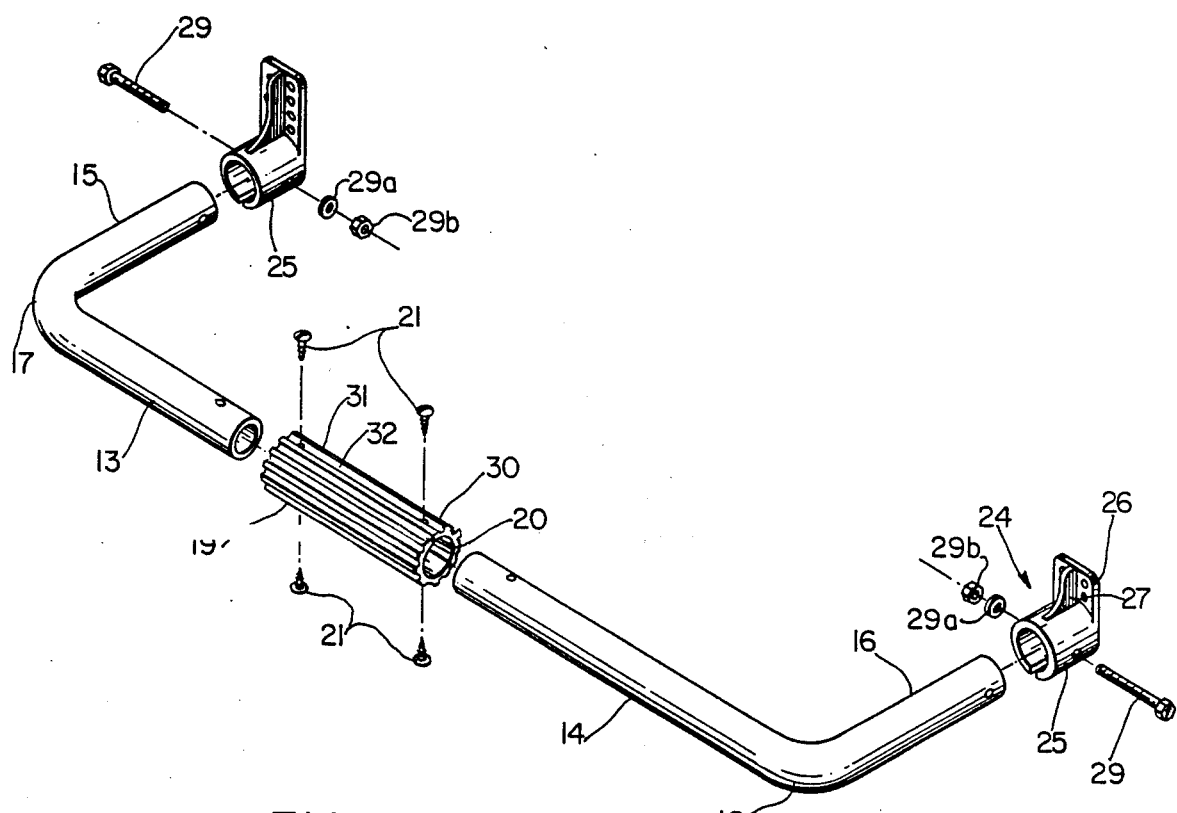
FIG. 2 is an exploded perspective view of the side bar assemblies.
Figure 3:
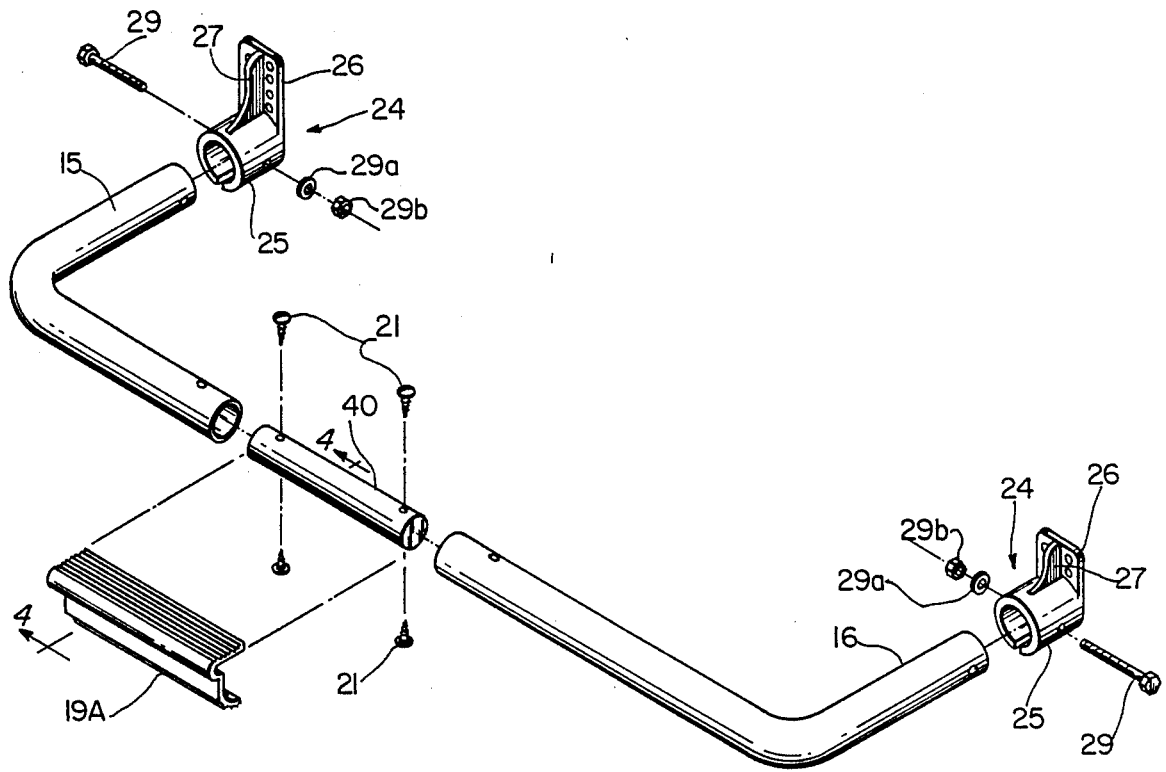
FIG. 3 is an exploded perspective view showing a variation of the side bar assembly using a partially encircling shaped connector sleeve.

The innermost end portions of the transverse legs 15, 16 of the L-shaped half bar sections 11, 12 are supported by mounting bracket formations 24 having a cylindrical socket formation 25 and a flange plate portion 26, and may optionally include together with a reinforcing gusset 27. The mounting brackets are attached to the vehicle chassis by bolts extending through openings in the flange portion 26 and holes formed in the vehicle chassis, or the flange portion 26 can be welded to the chassis as an alternative mounting method. The end portions of the transverse legs 15, 16 of the L-shaped half bar sections 11, 12 are inserted into the cavities provided by the cylindrical socket formations 25 of the mounting brackets 24 and are securely fastened in place by bolts 29 extending through aligned openings in the tubular leg portions 15, 16 and in the socket formations 25, the bolts being fixed by lockwashers and nuts 29b as shown in FIGS. 2 and 3. The mounting brackets 24 may be formed as metal casting or steel weldments, and the cylindrical socket formation 25 forming part of the mounting bracket may either have continuous walls or may have an axial slot to facilitate a clamping action.

As will be apparent from the various figures, different cross-sectional configurations may be provided for the connector sleeve 19. For example, the connector sleeve 19 may be of the configuration shown in FIGS. 1 and 2, wherein the sleeve is of uninterrupted generally tubular circular configuration having a circular bore 20 whose inner diameter corresponds to the outer diameter of the leg sections 13, 14 and having a ribbed outer periphery, shown at 30, providing longitudinally extending, alternating ribs 31 and recesses or channels 32 extending along the longitudinal axis paralleling the axis of the connector 30. The ribbed exterior surface for the connector sleeve provides an anti-skid grooved surface configuration resisting skidding or slipping on the step surface defined by the connector sleeve 30.

Figure 4:
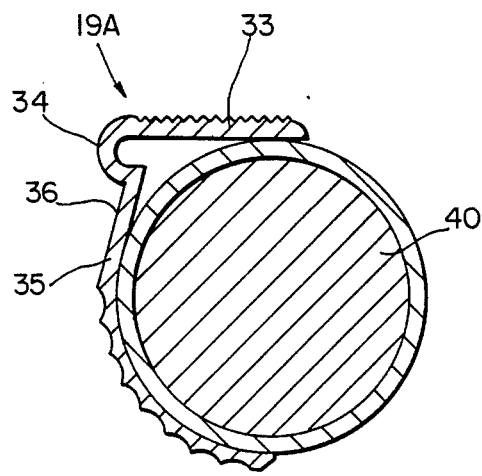
FIG. 4 is a partial vertical section view, to enlarged scale, taken along line 4—4 of FIG. 3, showing the connector sleeve and a half-bar of of the side bar assembly when assembled, with the connector rod removed for clarity.
Figure 4A:
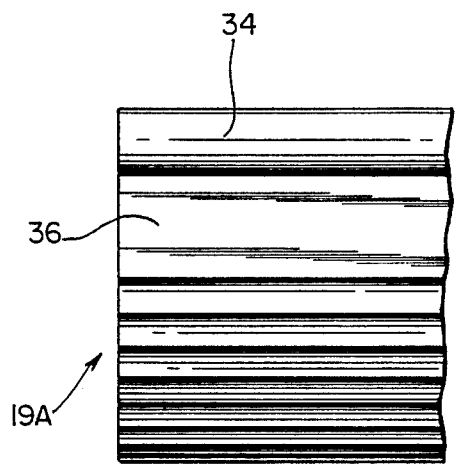
FIG. 4A is a partial front elevational view of the connector sleeve shown in FIG. 4.

Alternatively, the connector sleeve is an interrupted partial sleeve, indicated generally at 19A in FIGS. 3, 4 and 4A, providing a "tau-shaped" cross-section including a flat upper step portion 33 extending from a location slightly outwardly of a vertical tangent plane of the outermost surface portion of the aligned tube legs 13, 14 to a location spaced slightly inwardly of the vertical plane through the center longitudinal axis of the tube legs 13, 14, with the outermost portion joining a rounded nosing portion 34 which merges into a downwardly curving wrap portion 35 defining a partial cylindrical surface or concave arcuate portion whose radius of curvature corresponds to the radius of the outer surface of the tube legs 13, 14 and wraps around the adjacent end portions of these tube legs in partially encircling relation. The wrap portion 35 may have a flat zone 36 forming a mini-board for receiving a trademark decal or product designating logo, or the like. In this embodiment, it may be desirable to provide an internal connector rod 40, of appropriate diameter to fit inside of the tubular half bars or tube legs 13, 14, secured thereto by fastening screws 21. In this illustrated embodiment, the joint encircling connector sleeve 19A is formed as an extruded aluminum cover.

Figure 5:
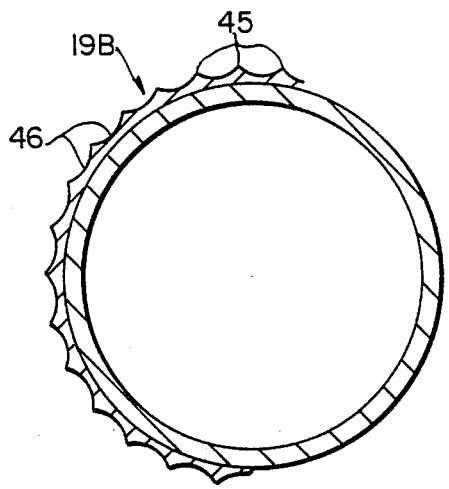
FIG. 5 is a vertical section view taken along the section plane similar to that indicated by line 4—4 of FIG. 3, showing another connector sleeve shape for joining together the half-bars of the side-bar assembly.
Figure 5A:
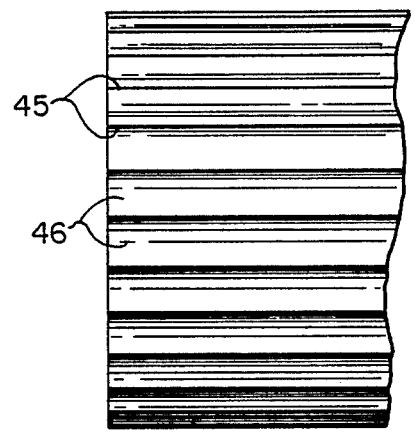
FIG. 5A is partial front elevational view of the connector sleeve of FIG. 5.
Figure 6:
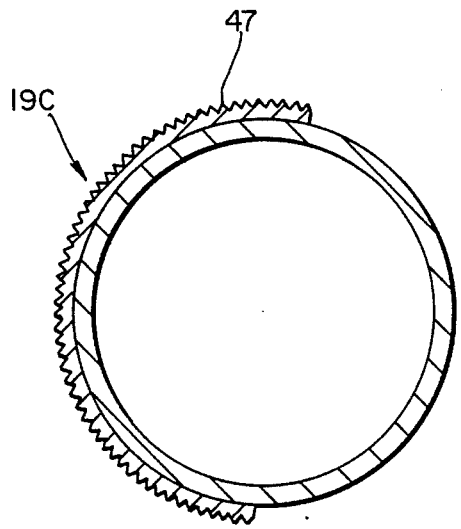
FIG. 6 is a vertical section view taken along the section plane similar to that indicated by line 4—4 of FIG. 3, showing another connector sleeve shape for joining together the half-bars of the side-bar assembly.
Figure 6A:
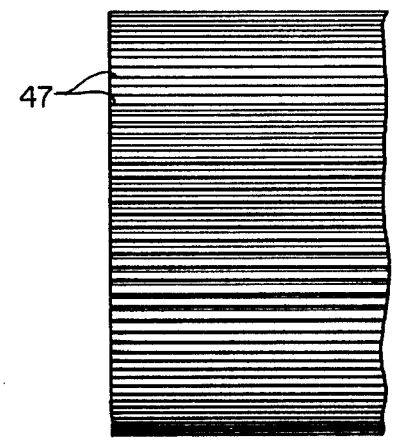
FIG. 6A is a partial front elevational view of the connector sleeve of FIG. 5.
Figure 7:
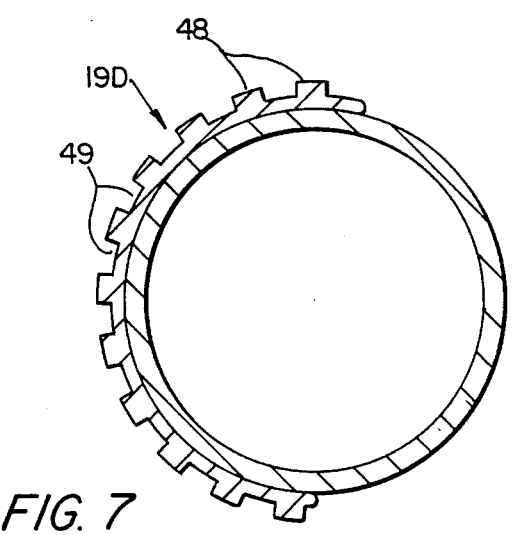
FIG. 7A is a partial front elevational view of the sleeve of FIG. 7.
Figure 7A:
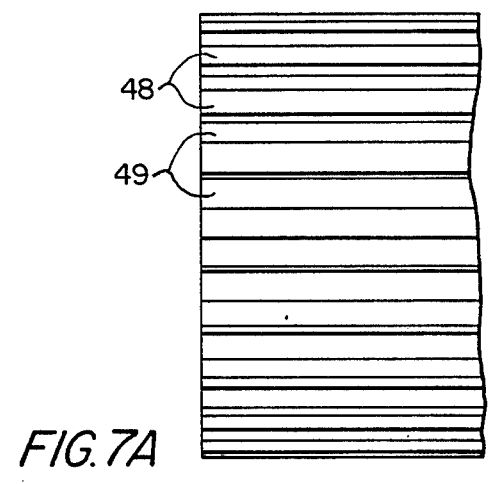

Other embodiments are illustrated at 19B, 19C and 19D and FIGS. 5, 5A and 6, 6A and 7, 7A, each formed of extruded aluminum or other appropriate material to form a partial cover for the joint or seam between the two tube, legs 13, 14. In FIGS. 5, 5A, the partially encircling fluted cover member has a plurality of sharply pointed ridges 45 defined at the intersections of cylindrically concave channel or groove formations 46 extending lengthwise of the connector sleeve or cover 19B from end to end, while in FIGS. 6, 6A the surface of the partially encircling connector sleeve or cover 19C has a serrated or wedge-shape toothed, tread-like surface having a triangular cross-section as indicated at 47, and in FIGS. 7, 7A a plurality of rectangular cross-section ribs 48 alternating with rectangular cross-section valleys or channels 49 define the roughened antiskid surface of the partially encircling connector sleeve or joint cover 19D.

To summarize the extensive 2-directional adjustability which is available for this product rendering it adaptable to be mounted on a large variety of vehicles, the following adjustment features are provided:

(a) lengthwise or axial adjustment of the unit is facilitated by the connector sleeve 19 which allows cutting off of the half bars 11 and 12 and thus allows the lengthwise adjustment without loss of the bar strength.

(b) depth or radial adjustment is facilitated by the socket type mounting brackets 24 which allow cutting off of the transverse leg 15 and 16 of the half-bar sections 11, 12 and thus allow the depth adjustment without loss of the bar strength.

(c) the overall design also includes two additional features concerning a limited extent height or vertical adjustment:

(aa) the mounting brackets 24 can be rotated sideways, that is, the longer axis of the rectangular plate 26 can be oriented any where between vertical and horizontal positions, thus allowing the bar to be raised in some installations.

(bb) the rear mounting bracket 24 can be shortened or cut down up to the size of a 4 hole bracket, eliminating 2 or 4 of the 8 holes shown and the associated surrounding portions of the plate, which also allows the bar to be raised in some applications.

I claim:

1. A side-bar assembly for attachment to a chassis of a pick-up truck, off-road vehicle or the like capable of being mounted on such vehicles of a plurality of different sizes and configurations, the side bar assembly comprising a pair of substantially L-shaped tubular members forming half-bar tube sections to collectively form a generally U-shaped side bar to extend laterally from a side of the vehicle wherein the U-shaped side bar includes a pair of transverse parallel side-legs to project substantially perpendicular to the vehicle longitudinal axis and a connecting cross-leg to extend parallel to said axis, the L-shaped tubular members being of predetermined outer radius and each having a first straight tube leg to form one of the side-legs of the U-shaped side bar and having a second straight tube leg connected to the first tube leg by a curved substantially 90° bend to form the cross-leg of the side bar, a substantially semi-cylindrical connector sleeve defining a concave tube-gripping recess having a radius over a portion thereof corresponding substantially to said outer radius of said second tube legs to receive the latter therein in alignment with each other with the connector sleeve partially encircling and gripping adjacent portions of the second tube legs over more than half a circumferential extent of each, and mounting means for bolt securement to the vehicle chassis to receive and support end portions of the side-legs therein, said connector sleeve being an axially elongated cylindrically curved body having a partially encircling inwardly concave abutment surface to engage and conform to confronting exterior surfaces in the tube legs along the axial length of the sleeve for at least about a quarter of the circumference of the tube legs and having an uppermost part thereof shaped to define a step-on tread-forming portion to abut the tube legs along a longitudinal line at a tube leg location diametrically opposite portions of the tube leg engaged by part of said concave abutment surface.

2. A side bar assembly as defined in claim 1 wherein said connector sleeve has a cross-section resembling the greek letter tau.

3. A side bar assembly as defined in claim 1, wherein the step-on tread-forming portion of said connector sleeve has a horizontal top portion engaging upwardly facing confronting surface portions of the tube legs adjacent one lateral margin of the top portion forming an inboard margin thereof and having a rounded nosing formation along the opposite lateral margin forming an outboard margin thereof.

4. A side bar assembly as defined in claim 2, wherein the step-on tread-forming portion of said connector sleeve has a horizontal top portion engaging upwardly facing confronting surface portions of the tube legs adjacent one lateral margin of the top portion forming an inboard margin thereof and having a rounded nosing formation along the opposite lateral margin forming an outboard margin thereof.

5. A side bar assembly as defined in claim 1 wherein said connector sleeve is of axially elongated tubular cylindrical configuration concentric with a longitudinal axis aligned with a center axis of said tube legs when the latter are in alignment, the connector sleeve having a circumferential extent slightly greater than half the circumference of said tube legs.

6. A side bar assembly as defined in claim 1 wherein said connector sleeve is of axially elongated tubular cylindrical configuration concentric with a longitudinal axis aligned with a center axis of said tube legs when the latter are in alignment, the connector sleeve having a circumferential extent slightly greater than half the circumference of said tube legs, and said connector sleeve having a concave fluted outer periphery with the fluting thereof formed as axially elongated outwardly concave cylindrical recesses paralleling the center axes of said tube legs in installed position and having intersections defining elongated pointed ridges paralleling the tube leg center axes.

7. A side bar assembly as defined in claim 1 wherein said connector sleeve is of axially elongated tubular cylindrical configuration concentric with a longitudinal axis aligned with a center axis of said tube legs when the latter are in alignment, the connector sleeve having a circumferential extent slightly greater than half the circumference of said tube legs, and said connector sleeve having a serrated outer periphery formed of outwardly pointing wedge-shaped teeth of triangular cross-section elongated along axes paralleling the center axes of said tube legs in installed position.

8. A side bar assembly as defined in claim 1 wherein said connector sleeve is of axially elongated tubular cylindrical configuration concentric with a longitudinal axis aligned with a center axis of said tube legs when the latter are in alignment, the connector sleeve having a circumferential extent slightly greater than half the circumference of said tube legs, and said connector sleeve having a ribbed outer periphery formed of outwardly projecting, rectangular cross-section ribs and alternating channels, elongated along axes paralleling the center axes of said tube legs in installed position.

9. A side bar assembly for attachment to a chassis of a pick-up truck, off-road vehicle or the like capable of being mounted on such vehicles of a plurality of different sizes and configuration, the side bar assembly comprising a pair of substantially L-shaped tubular members forming half-bar tube sections to collectively form a generally U-shaped side bar to extend laterally from a side of the vehicle wherein the U-shaped side bar includes a pair of transverse parallel side-legs to project substantially perpendicular to the vehicle longitudinal axis and a connecting cross-leg to extend parallel to said axis, the L-shaped tubular members being of predetermined outer radius and each having a first straight tube leg to form one of the side-legs of the U-shaped side bar and having a second straight tube leg connected to the first tube leg by a curved substantially 90° bend to form the cross-leg of the side bar, a substantially semi-cylindrical connector sleeve defining a concave tube-gripping recess having a radius over a portion thereof corresponding substantially to said outer radius of said second tube legs to receive the later wherein in alignment with each other with the connector sleeve partially encircling and gripping adjacent portions of the second tube legs over more than half a circumferential extent of each, and mounting means for bolt securement to the vehicle chassis to receive and support end portions of the side-legs therein, said connector sleeve being a metal extrusion configured as an axially elongated cylindrically curved body having a partially encircling inwardly concave abutment surface to engage and conform to confronting exterior surfaces in the tube legs along the axial length of the sleeve for at least about a quarter of the circumference of the tube legs and having an uppermost part thereof shaped to define a step-on tread forming portion to abut the tube legs along a longitudinal line at a tube leg location diametrically opposite portions of the tube leg engaged by part of said concave abutment surface.

10. A side bar assembly as defined in claim 9, wherein the step-on tread-forming portion of said connector sleeve has a horizontal top portion engaging upwardly facing confronting surface portions of the tube legs adjacent one lateral margin of the top portion forming an inboard margin thereof and having a rounded nosing formation along the opposite lateral margin forming an outboard margin thereof.

* * * * *